United States Patent [19]

Itoh et al.

[11] 4,089,911

[45] May 16, 1978

[54] PROCESS FOR IMPROVING THE THERMAL STABILITY OF POLYURETHANE-CONTAINING RESIN COMPOSITION

[75] Inventors: Yoshio Itoh; Kakuji Satoh, both of Yokohama; Yuji Suzuki, Wakayama; Yasuo Miura, Wakayama; Yoshiteru Kazama, Wakayama; Saburo Yazawa, Fujisawa, all of Japan

[73] Assignees: Kao Soap Co., Ltd., Tokyo; Sankyo Organic Chemicals Co., Ltd., Kawasaki, both of Japan

[21] Appl. No.: 779,481

[22] Filed: Mar. 21, 1977

[30] Foreign Application Priority Data

Apr. 30, 1976  Japan .................................. 51-49426

[51] Int. Cl.² ............................................. C08L 75/00
[52] U.S. Cl. ...................... 260/859 PV; 260/45.85 H
[58] Field of Search .................. 260/859 PV, 45.85 H

[56] References Cited

U.S. PATENT DOCUMENTS

| | | | |
|---|---|---|---|
| 2,606,162 | 8/1952 | Coffey | 260/859 PV |
| 3,204,013 | 8/1965 | Osborn | 260/859 PV |
| 3,350,332 | 10/1967 | Hardy | 260/859 PV |
| 3,350,333 | 10/1967 | Beer | 260/859 PV |
| 3,428,598 | 2/1969 | Matsubayashi | 260/45.85 H |
| 3,637,553 | 1/1972 | Keberle | 260/859 PV |
| 3,882,191 | 5/1975 | Balatoni | 260/859 PV |
| 3,984,493 | 10/1976 | Kazama | 260/859 PV |
| 3,984,607 | 10/1976 | Thoma | 260/859 PV |

FOREIGN PATENT DOCUMENTS

| | | |
|---|---|---|
| 72-24004 | 7/1972 | Japan. |
| 72-24541 | 7/1972 | Japan. |
| 7,224,005 | 7/1972 | Japan. |
| 1,119,041 | 7/1968 | United Kingdom ........... 260/859 PV |

Primary Examiner—Paul Lieberman
Attorney, Agent, or Firm—Blanchard, Flynn, Thiel, Boutell & Tanis

[57] ABSTRACT

Blends of 30 to 90 weight percent of polyurethane resin and 70 to 10 weight percent of polyvinyl chloride resin are provided with thermal stability by incorporating therein a compound having the formula

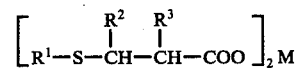

wherein
  R¹ is cycloalkyl, alkenyl, aralkyl or alkyl,
  R² and R³ each are hydrogen, methyl, ethyl or aryl and
  M is barium, calcium or magnesium.

16 Claims, No Drawings

PROCESS FOR IMPROVING THE THERMAL STABILITY OF POLYURETHANE-CONTAINING RESIN COMPOSITION

BACKGROUND OF THE INVENTION

1. Field of the Invention

The present invention relates to a process for improving the thermal stability of a resin composition comprising a polyurethane resin and a polyvinyl chloride resin, and the composition thereby obtained. More particularly, the invention relates to a process for improving the thermal stability of polyurethane-containing resin compositions, characterized in that a sulfur-containing carboxylic acid metal salt having the formula:

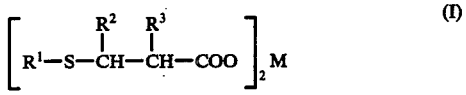

wherein
- $R^1$ is cycloalkyl, alkenyl or aralkyl group or alkyl having 4 to 18 carbon atoms,
- $R^2$ and $R^3$ each are hydrogen, methyl, ethyl or aryl, and
- M is barium, calcium or magnesium, is incorporated in a resin composition comprising a polyurethane resin and a polyvinyl chloride resin blended at a weight ratio of from 9:1 to 3:7.

2. Description of the Prior Art

In general, polyurethane resins possess excellent properties such as abrasion resistance, solvent resistance and toughness, but because they have urethane linkages, namely, carbonamide linkages

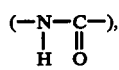

they are inferior in weatherability and thermal stability. Accordingly, when they are exposed to heat during molding, for example, injection molding, extrusion molding or calender molding, they are drastically degraded and discolored. In addition, polyurethane resins are disadvantageous because they are more expensive than other thermoplastic resins, such as polyvinyl chloride, polyethylene and the like, and the ease of processing the same during molding is insufficient.

If the foregoing disadvantages of polyurethane resins are overcome, it will be possible to use them more effectively in various fields for the production of films, sheets, artificial leathers, belts, tubes, hoses, packings, coated wires and other electric appliances, as powder adhesives for sewing and as adhesives for making shoes by injection molding. Therefore, it has been desired in the art to overcome the foregoing disadvantages of polyurethane resins.

It has been considered that these defects can be overcome by blending polyurethane resins with relatively inexpensive common thermoplastic resins having an excellent processability during molding, particularly polyvinyl chloride resins, and various attempts to do so have heretofore been made. However, a heat stabilizer having a good effect of preventing thermal degradation of such a composition has not been found and, therefore, a satisfactory improvement has not been attained in the art.

We investigated the effects of improving the thermal stability of blends of polyurethane resins and polyvinyl chloride resins by the use of known stabilizers for polyurethane resins such as nitrogen-containing stabilizers (for example, phenyl-β-naphthylamine), sulfur-containing stabilizers (for example, β-laurylthiopropionic acid), phenol type stabilizers (for example, 2,6-di-tert-butyl-4-methylphenol) and phosphorus-containing stabilizers (Irganox 1890 (product of Ciba-Geigy) and trinonylphenyl phosphite), and known stabilizers customarily used for polyvinyl chloride resins such as calcium stearate, zinc stearate, barium stearate, cadmium stearate, cadmium-barium type composite metal soaps, organotin compounds, organic phosphorous acid esters, epoxy compounds and antioxidants, and we used these stabilizers singly and in combination. However, contrary to our expectation, a satisfactory result could not be obtained in each case.

It was found that a sufficient thermal stabilization effect cannot be attained by the use, in resin compositions comprising a polyurethane resin and a polyvinyl chloride resin, of either or both of the thermal stabilizers known for use in polyurethane resins and in polyvinyl chloride resins, and that a quite different kind of thermal stabilizer must be developed for such resin compositions.

Organotin compounds which have an excellent thermal stabilizing effect to polyvinyl chloride resins are insufficient in the effect of improving the thermal stability of resin compositions comprising a polyurethane resin and a polyvinyl chloride resin, but it has been found that barium stearate which is inferior in the initial thermal stabilizing effect to polyvinyl chloride resins has a relatively high effect of improving the thermal stability of such resin compositions.

SUMMARY OF THE INVENTION

We have discovered an excellent thermal stabilizer for resin compositions comprising a polyurethane resin and a polyvinyl chloride resin, namely, a sulfur-containing carboxylic acid metal salt having the formula

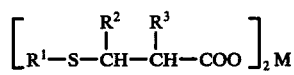

wherein
- $R^1$ is a hydrocarbon group of
  - (a) cycloalkyl, preferably cycloalkyl having 6 to 7 carbon atoms, most preferably cyclohexyl,
  - (b) alkenyl, preferably alkenyl having 4 to 18 carbon atoms, most preferably octadecenyl,
  - (c) aralkyl, preferably aralkyl having 7 to 12 carbon atoms, most preferably benzyl, or
  - (d) straight chain or branched alkyl having 4 to 18 carbon atoms
- $R^2$ and $R^3$, which can be the same or different, are hydrogen, methyl, ethyl or aryl, wherein aryl preferably has 6 to 12 carbon atoms, most preferably benzyl, and
- M is barium, calcium or magnesium, preferably calcium and barium, most preferably barium.

The polyurethane resin that is used in the present invention is one that is prepared by reacting a polymer diol component with an organic diisocyanate. A chain extender can be used in this reaction.

As the polymer diol component, there can be mentioned, for example, a polyester diol, a polyether diol, a polyolefin diol and a polylactone diol.

It is necessary that the molecular weight of the polymer diol should be at least 500, and it is preferred that the molecular weight of the polymer diol be lower than 10,000.

As the dicarboxylic acid that is used for preparing the polyester diols, there can be mentioned, for example, glutaric acid, adipic acid, succinic acid, suberic acid, sebacic acid, oxalic acid, methyladipic acid, pimelic acid, azelaic acid, terephthalic acid, isophthalic acid, maleic acid and fumaric acid. As the diol, there can be used, for example, ethylene glycol, 1,4-butane diol, 1,6-hexane diol, propylene glycol, diethylene glycol and neopentyl glycol. Hydroxypolyester amides can also be employed.

As the polyether diol, there can be mentioned, for example, polyethylene glycol, polypropylene glycol and polytetramethylene glycol.

As the polyolefin diol, there can be used, for example, polybutadiene diol, and as the polylactone diol, there can be used, for example, poly-ε-caprolactone diol.

As the chain extender, there can be used diols such as those exemplified above with respect to the component of the polyester diol, and in addition, water and diamines can be used. Any aliphatic diamines and aromatic diamines such as ethylene diamine, propylene diamine and xylylene diamine can be used as the amine.

As the organic diisocyanate, there can be used, for example, 4,4'-diphenylmethane diisocyanate, 4,4'-diphenyl diisocyanate, 2,4-tolylene diisocyanate, 2,6-tolylene diisocyanate, 1,5-naphthylene diisocyanate, o-, m- and p-xylylene diisocyanates, tetramethylene diisocyanate, pentamethylene diisocyanate and hexamethylene diisocyanate. These organic diisocyanates may be used singly or in the form of a mixture of two or more of them. If desired, chlorinated and brominated diisocyanates and phosphorus-containing diisocyanates can be used in combination with the above-mentioned organic diisocyanates. From the technical viewpoint, no particular disadvantage will be brought about even if a small proportion of the organic diisocyanate that is used in the present invention is replaced by a tri-functional or higher polyisocyanate.

The polyvinyl chloride resin that is used in the present invention is a vinyl chloride-containing polymer which includes homopolymers of vinyl chloride and copolymers composed mainly of vinyl chloride, such as a vinyl chloride-vinyl acetate copolymer, a vinyl chloride-vinyl ether copolymer, a vinyl chloride-vinylidene chloride copolymer, a vinyl chloride-propylene copolymer and a vinyl chloride-ethylene-vinyl acetate copolymer.

As the polyvinyl chloride resin, there can also be used polymer blends of such polyvinyl chloride resins with other polymers such as an acrylonitrile-butadiene-styrene copolymer, a methyl methacrylate-butadiene-styrene copolymer, a styrene-acrylonitrile copolymer, an acrylonitrile-butadiene copolymer, an ethylene-vinyl acetate copolymer and a chlorinated polyethylene.

As preferred examples of the thermal stabilizer of the above formula (I) that can be used in the present invention, there can be mentioned metal salts of sulfur-containing carboxylic acid having the following formulas (in which M is barium, calcium or magnesium):

$(C_4H_9SCH_2CH_2COO)_2M$

$(C_6H_{13}SCH_2CH_2COO)_2M$
$(C_8H_{17}SCH_2CH_2COO)_2M$
$[C_4H_9CH(C_2H_5)CH_2SCH_2CH_2COO]_2M$
$[C_5H_{11}CH(CH_3)CH_2SCH_2CH_2COO]_2M$
$(C_{10}H_{21}SCH_2CH_2COO)_2M$
$(C_{12}H_{25}SCH_2CH_2COO)_2M$
$(C_{14}H_{29}SCH_2CH_2COO)_2M$
$(C_{16}H_{33}SCH_2CH_2COO)_2M$
$(C_{18}H_{37}SCH_2CH_2COO)_2M$
$(C_{18}H_{35}SCH_2CH_2COO)_2M$

$(C_6H_{11}SCH_2CH_2COO)_2M$
$[C_4H_9SCH_2CH(CH_3)COO]_2M$
$[C_6H_{13}SCH_2CH(CH_3)COO]_2M$
$[C_8H_{17}SCH_2CH(CH_3)COO]_2M$
$[C_4H_9CH(C_2H_5)CH_2SCH_2CH(CH_3)COO]_2M$
$[C_5H_{11}CH(CH_3)CH_2SCH_2CH(CH_3)COO]_2M$
$[C_{10}H_{21}SCH_2CH(CH_3)COO]_2M$
$[C_{12}H_{25}SCH_2CH(CH_3)COO]_2M$
$[C_{14}H_{29}SCH_2CH(CH_3)COO]_2M$
$[C_{16}H_{33}SCH_2CH(CH_3)COO]_2M$
$[C_{18}H_{37}SCH_2CH(CH_3)COO]_2M$
$[C_{18}H_{35}SCH_2CH(CH_3)COO]_2M$

$[C_6H_{11}SCH_2CH(CH_3)COO]_2M$
$[C_4H_9SCH(CH_3)CH_2COO]_2M$
$[C_6H_{13}SCH(CH_3)CH_2COO]_2M$
$[C_8H_{17}SCH(CH_3)CH_2COO]_2M$
$[C_4H_9CH(C_2H_5)CH_2SCH(CH_3)CH_2COO]_2M$
$[C_5H_{11}CH(CH_3)CH_2SCH(CH_3)CH_2COO]_2M$
$[C_{10}H_{21}SCH(CH_3)CH_2COO]_2M$
$[C_{12}H_{25}SCH(CH_3)CH_2COO]_2M$
$[C_{14}H_{29}SCH(CH_3)CH_2COO]_2M$
$[C_{16}H_{33}SCH(CH_3)CH_2COO]_2M$
$[C_{18}H_{37}SCH(CH_3)CH_2COO]_2M$
$[C_{18}H_{35}SCH(CH_3)CH_2COO]_2M$

$[C_6H_{11}SCH(CH_3)CH_2COO]_2M$
$[C_4H_9SCH(C_6H_5)CH_2COO]_2M$
$[C_6H_{13}SCH(C_6H_5)CH_2COO]_2M$
$[C_8H_{17}SCH(C_6H_5)CH_2COO]_2M$
$[C_4H_9CH(C_2H_5)CH_2SCH(C_6H_5)CH_2COO]_2M$
$[C_5H_{11}CH(CH_3)CH_2SCH(C_6H_5)CH_2COO]_2M$
$[C_{10}H_{21}SCH(C_6H_5)CH_2COO]_2M$
$[C_{12}H_{25}SCH(C_6H_5)CH_2COO]_2M$
$[C_{14}H_{29}SCH(C_6H_5)CH_2COO]_2M$
$[C_{16}H_{33}SCH(C_6H_5)CH_2COO]_2M$
$[C_{18}H_{37}SCH(C_6H_5)CH_2COO]_2M$
$[C_{18}H_{35}SCH(C_6H_5)CH_2COO]_2M$

$[C_6H_{11}SCH(C_6H_5)CH_2COO]_2M$
$[C_4H_9SCH_2CH(C_2H_5)COO]_2M$
$[C_6H_{13}SCH_2CH(C_2H_5)COO]_2M$

[C$_8$H$_{17}$SCH$_2$CH(C$_2$H$_5$)COO]$_2$M
[C$_4$H$_9$CH(C$_2$H$_5$)CH$_2$SCH$_2$CH(C$_2$H$_5$)COO]$_2$M
[C$_5$H$_{11}$CH(CH$_3$)CH$_2$SCH$_2$CH(C$_2$H$_5$)COO]$_2$M
[C$_{10}$H$_{21}$SCH$_2$CH(C$_2$H$_5$)COO]$_2$M
[C$_{12}$H$_{25}$SCH$_2$CH(C$_2$H$_5$)COO]$_2$M
[C$_{14}$H$_{29}$SCH$_2$CH(C$_2$H$_5$)COO]$_2$M
[C$_{16}$H$_{33}$SCH$_2$CH(C$_2$H$_5$)COO]$_2$M
[C$_{18}$H$_{37}$SCH$_2$CH(C$_2$H$_5$)COO]$_2$M
[C$_{18}$H$_{35}$SCH$_2$CH(C$_2$H$_5$)COO]$_2$M

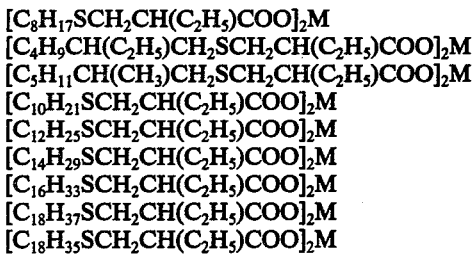

[C$_6$H$_{11}$SCH$_2$CH(C$_2$H$_5$)COO]$_2$M
[C$_4$H$_9$SCH(C$_2$H$_5$)CH$_2$COO]$_2$M
[C$_6$H$_{13}$SCH(C$_2$H$_5$)CH$_2$COO]$_2$M
[C$_8$H$_{17}$SCH(C$_2$H$_5$)CH$_2$COO]$_2$M
[C$_4$H$_9$CH(C$_2$H$_5$)CH$_2$SCH(C$_2$H$_5$)CH$_2$COO]$_2$M
[C$_5$H$_{11}$CH(CH$_3$)CH$_2$SCH(C$_2$H$_5$)CH$_2$COO]$_2$M
[C$_{10}$H$_{21}$SCH(C$_2$H$_5$)CH$_2$COO]$_2$M
[C$_{12}$H$_{25}$SCH(C$_2$H$_5$)CH$_2$COO]$_2$M
[C$_{14}$H$_{29}$SCH(C$_2$H$_5$)CH$_2$COO]$_2$M
[C$_{16}$H$_{33}$SCH(C$_2$H$_5$)CH$_2$COO]$_2$M
[C$_{18}$H$_{37}$SCH(C$_2$H$_5$)CH$_2$COO]$_2$M
[C$_{18}$H$_{35}$SCH(C$_2$H$_5$)CH$_2$COO]$_2$M

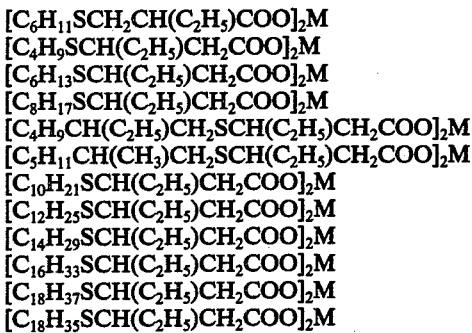

[C$_6$H$_{11}$SCH(C$_2$H$_5$)CH$_2$COO]$_2$M

As more preferred examples, there are mentioned compounds having the following formulas (in which M' is barium or calcium):

[C$_8$H$_{17}$SCH$_2$CH$_2$COO]$_2$M'
[C$_4$H$_9$CH(C$_2$H$_5$)CH$_2$SCH$_2$CH$_2$COO]$_2$M'
[C$_5$H$_{11}$CH(CH$_3$)CH$_2$SCH$_2$CH$_2$COO]$_2$M'
[C$_{10}$H$_{21}$SCH$_2$CH$_2$COO]$_2$M'
[C$_{12}$H$_{25}$SCH$_2$CH$_2$COO]$_2$M'
[C$_{14}$H$_{29}$SCH$_2$CH$_2$COO]$_2$M'
[C$_{16}$H$_{33}$SCH$_2$CH$_2$COO]$_2$M'
[C$_{18}$H$_{37}$SCH$_2$CH$_2$COO]$_2$M'

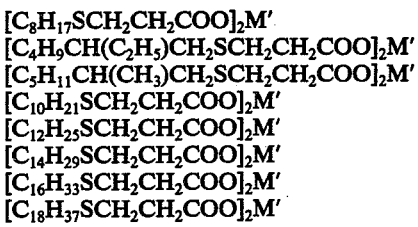

[C$_8$H$_{17}$SCH$_2$CH(CH$_3$)COO]$_2$M'
[C$_4$H$_9$CH(C$_2$H$_5$)CH$_2$SCH$_2$CH(CH$_3$)COO]$_2$M'
[C$_5$H$_{11}$CH(CH$_3$)CH$_2$SCH$_2$CH(CH$_3$)COO]$_2$M'
[C$_{10}$H$_{21}$SCH$_2$CH(CH$_3$)COO]$_2$M'
[C$_{12}$H$_{25}$SCH$_2$CH(CH$_3$)COO]$_2$M'
[C$_{14}$H$_{29}$SCH$_2$CH(CH$_3$)COO]$_2$M'
[C$_{16}$H$_{33}$SCH$_2$CH(CH$_3$)COO]$_2$M'
[C$_{18}$H$_{37}$SCH$_2$CH(CH$_3$)COO]$_2$M'

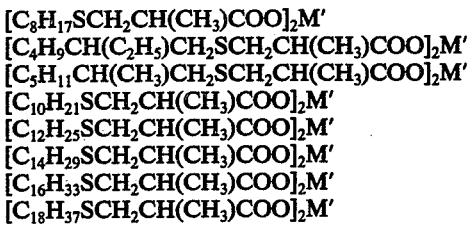

As the most preferred examples, there are mentioned compounds having the following rational formulas:

[C$_{12}$H$_{25}$SCH$_2$CH$_2$COO]$_2$Ba
[C$_{18}$H$_{37}$SCH$_2$CH$_2$COO]$_2$Ba

[C$_8$H$_{17}$SCH$_2$CH(CH$_3$)COO]$_2$Ba
[C$_{12}$H$_{25}$SCH$_2$CH(CH$_3$)COO]$_2$Ba
[C$_{18}$H$_{37}$SCH$_2$CH(CH$_3$)COO]$_2$Ba

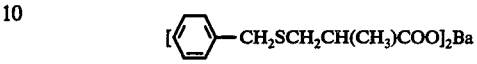

Various metal salts of sulfur-containing carboxylic acids can be considered for the present invention. As the result of our experiments, it was found that barium, magnesium and calcium salts are especially effective, and that particularly good results are obtained when barium salts are employed. Although cadmium salts also are effective, the use of them is not preferred because cadmium involves a health problem.

In practicing the stabilizing process of the present invention, the sulfur-containing carboxylic acid metal salt of formula (I) is incorporated in an amount of from 0.1 to 10 parts by weight per 100 parts by weight of a resin composition comprising a polyurethane resin and a polyvinyl chloride resin. When the amount of the stabilizer is less than 0.1 part by weight, no substantial stabilizing effect can be obtained. The use of the stabilizer in an amount more than 10 parts by weight is not preferred from the economic viewpoint. In view of the moldability of the resin composition and from the economic viewpoint, it is preferred that at least one stabilizer selected from the above-exemplified compounds be used in an amount of 0.3 to 3 parts by weight per 100 parts by weight of the resin composition and that it is incorporated into the resin composition by a conventional blending method.

If desired, there can be used in the resin composition various additives in combination with the above stabilizer. For example, there can be used metal soaps such as barium stearate, calcium stearate and zinc stearate, organotin compounds, inorganic metal salts, phenols, epoxy compounds, organic phosphorous acid esters, antioxidants, dyes, pigments, fillers, antistatic agents, plasticizers and lubricants.

The stabilizer of the present invention is effective when the weight ratio of the polyurethane resin to the polyvinyl chloride resin is in the range of from 9:1 to 3:7, preferably from 6:4 to 4:6. When the blending ratio of the polyurethane resin and the polyvinyl chlorine resin is such that the polyvinyl chloride resin is more than 70% by weight, based on the total weight of the resin ingredients of the resin composition, no substantial effect of improving the thermal stability can be attained, and a resin composition in which the polyvinyl chloride resin content is lower than 10% by weight is not preferred from the economic viewpoint and in view of the processability and weatherability of the resin composition.

For further describing the present invention, illustrative Examples will now be described. In these Examples, all references to "parts" mean parts by weight.

EXAMPLE 1

To 100 parts of a resin composition comprising a polyurethane resin (obtained by reacting a mixture containing polybutylene adipate diol (having a molecular weight of 2500) and 1,4-butane diol at a molar ratio of 2:1 with tolylene diisocyanate) and a polyvinyl chloride resin (having a degree of polymerization of 800) at a weight ratio of 6:5, there were added 0.5 part of zinc stearate and 2.0 parts of a metal salt of 3-n-dodecylthio-2-methylpropionic acid indicated in Table 1. The resulting composition was kneaded for 5 minutes by two rolls having a diameter of 8 inches and maintained at 160° C (the roll clearance being 0.5 mm and the rotation rate being 15 rpm) to form a sheet having a thickness of 0.5 mm.

The resulting sheet was cut into test specimens having a size of 7 cm × 4 cm and the thermal stability was tested by using a Geer oven maintained at 180° C. The thermal stability was evaluated according to the following method.

More specifically, test specimens were taken out from the Geer oven at predetermined intervals, and the degree of discoloration was examined with the naked eye and evaluated according to the following ratings:

1: white
2: light yellow
3: yellow
4: yellowing brown
5: brown
6: blackish brown excellent with respect to the attainment of durable heat resistance.

EXAMPLE 2

To 100 parts of a resin composition comprising a polyurethane resin (obtained by reacting a polyester having a molecular weight of 6300 (obtained by reacting a mixture containing 1,6-hexane diol and 1,3-butylene glycol at a weight ratio of 80:20 with adipic acid) with an equivalent amount of 4,4'-diphenylmethane diisocyanate) and a polyvinyl chloride resin (having a degree of polymerization of 1050), at a weight ratio of 6:5, there were added 0.5 part of zinc stearate and 2.0 parts of a stabilizer indicated in Table 2-(1), and the composition was kneaded for 5 minutes by two rolls having a diameter of 8 inches (the roll clearance being 0.5 mm and the rotation rate being 15 rpm), which were maintained at 160° C, to form a sheet having a thickness of 0.5 mm.

Separately, 0.5 part of zinc stearate and 2.0 parts of a stabilizer indicated in Table 2-(2) were added to 100 parts of a polyvinyl chloride resin (having a degree of polymerization of 1050). The resulting composition was kneaded under the same conditions as described above to form a sheet having a thickness of 0.5 mm.

The thermal stability was tested according to the same method as described in Example 1 with respect to

Table 1

| Sample No. | Stabilizer | Amount Added (parts) | Thermal Stability |||||| 
|---|---|---|---|---|---|---|---|---|
| | | | 5 minutes | 10 minutes | 15 minutes | 30 minutes | 45 minutes | 60 minutes |
| 1 (comparison) | not added | — | 2 | 4 | 5 | 6 | 6 | 6 |
| 2 (present invention) | $[C_{12}H_{25}SCH_2CH(CH_3)COO]_2Ba$ | 2.0 | 1 | 1 | 2 | 2 | 3 | 3 |
| 3 (present invention) | $[C_{12}H_{25}SCH_2CH(CH_3)COO]_2Ca$ | 2.0 | 1 | 1 | 2 | 3 | 4 | 5 |
| 4 (present invention) | $[C_{12}H_{25}SCH_2CH(CH_3)COO]_2Mg$ | 2.0 | 1 | 2 | 3 | 4 | 5 | 6 |
| 5 (comparison) | $[C_{12}H_{25}SCH_2CH(CH_3)COO]_2Zn$ | 2.0 | 3 | 5 | 6 | 6 | 6 | 6 |
| 6 (comparison) | $[C_{12}H_{25}SCH_2CH(CH_3)COO]_2Pb$ | 2.0 | 3 | 4 | 4 | 4 | 5 | 5 |
| | | | ←  | | (opaque) | | | → |
| 7 (comparison) | $[C_{12}H_{25}SCH_2CH(CH_3)COO]Na$ | 2.0 | 3 | 4 | 5 | 6 | 6 | 6 |

As will be apparent from the results shown in Table 1, the Ba, Ca and Mg salts are superior in comparison with other metal salts with respect to the effects of preventing initial discoloration and maintaining the heat resistance for a long time, and the Ba salts are especially each of the thus-prepared sheets and the results shown in Tables 2-(1) are 2-(2) were obtained. The thermal stability was evaluated in the same manner as described in Example 1.

Table 2-(1)

| Sample No. | Stabilizer | Amount Added (parts) | Thermal Stability |||||| 
|---|---|---|---|---|---|---|---|---|
| | | | 10 minutes | 20 minutes | 30 minutes | 45 minutes | 60 minutes | 75 minutes |
| 8 (present invention) | $[C_4H_9SCH_2CH(CH_3)COO]_2Ba$ | 2.0 | 1 | 2 | 2 | 3 | 3 | 4 |
| 9 (present invention | $[C_{12}H_{25}SCH_2CH(CH_3)COO]_2Ba$ | 2.0 | 1 | 2 | 2 | 3 | 3 | 4 |
| 10 (present invention) | $[C_{18}H_{37}SCH_2CH(CH_3)COO]_2Ba$ | 2.0 | 1 | 2 | 2 | 3 | 4 | 5 |
| 11 (present invention) |  | 2.0 | 1 | 2 | 2 | 3 | 3 | 4 |
| 12 (present invention) | $[C_{12}H_{25}SCH_2CH_2COO]_2Ba$ | 2.0 | 1 | 2 | 2 | 3 | 3 | 4 |

Table 2-(1)-continued

| Sample No. | Stabilizer | Amount Added (parts) | Thermal Stability 10 minutes | 20 minutes | 30 minutes | 45 minutes | 60 minutes | 75 minutes |
| --- | --- | --- | --- | --- | --- | --- | --- | --- |
| 13 (present invention) | $[C_{12}H_{25}SCH_2CH_2COO]_2Ba$ $[\langle\bigcirc\rangle-CH_2SCH_2CH_2COO]_2Ba$ | 1.0 ⎱ 1.0 ⎰ | 1 | 2 | 2 | 3 | 3 | 4 |
| 14 (comparison) | barium stearate | 2.0 | 2 | 3 | 3 | 4 | 5 | 6 |
| 15 (comparison) | dioctyl tin bis(isooctyl thioglycolate) | 2.0 | 2 | 3 | 4 | 5 | 6 | 6 |
| 16 (comparison) | Ep-828 (epoxy resin manufactured by Shell Chemical) | 2.0 | 2 | 3 | 4 | 5 | 6 | 6 |

Table 2-(2)

| Sample No. | Stabilizer | Amount Added (parts) | Thermal Stability 10 minutes | 20 minutes | 30 minutes | 45 minutes | 60 minutes | 75 minutes |
| --- | --- | --- | --- | --- | --- | --- | --- | --- |
| 17 (comparison) | $[C_4H_9SCH_2CH(CH_3)COO]_2Ba$ | 2.0 | 4 | 4 | 6 | 6 | 6 | 6 |
| 18 (comparison) | $[C_{12}H_{25}SCH_2CH(CH_3)COO]_2Ba$ | 2.0 | 4 | 4 | 6 | 6 | 6 | 6 |
| 19 (comparison) | $[C_{18}H_{37}SCH_2CH(CH_3)COO]_2Ba$ | 2.0 | 4 | 4 | 6 | 6 | 6 | 6 |
| 20 (comparison) | $[\langle\bigcirc\rangle-CH_2SCH_2CH(CH_3)COO]_2Ba$ | 2.0 | 4 | 4 | 6 | 6 | 6 | 6 |
| 21 (comparison) | $[C_{12}H_{25}SCH_2CH_2COO]_2Ba$ | 2.0 | 4 | 4 | 6 | 6 | 6 | 6 |
| 22 (comparison) | $[C_{12}H_{25}SCH_2CH_2COO]_2Ba$ $[\langle\bigcirc\rangle-CH_2SCH_2CH_2COO]_2Ba$ | 1.0 ⎱ 1.0 ⎰ | 4 | 4 | 6 | 6 | 6 | 6 |
| 23 (comparison) | barium stearate | 2.0 | 4 | 4 | 6 | 6 | 6 | 6 |
| 24 (comparison) | dioctyl tin bis(isooctyl glycolate) | 2.0 | 1 | 1 | 2 | 3 | 3 | 4 |
| 25 (comparison) | Ep-828 (epoxy resin manufactured by Shell Chemical | 2.0 | 4 | 6 | 6 | 6 | 6 | 6 |

From the results shown in Table 2-(1), it will readily be understood that the sulfur-containing carboxylic acid metal salts (barium salts) are superior in comparison with other stabilizers with respect to the effects of preventing the initial discoloration and maintaining the thermal stability for a long time. Further, from the results shown in Tables 2-(1) and 2-(2), it will readily be understood that these barium salts have a selective stabilizing effect to resin compositions comprising a polyurethane resin and a polyvinyl chloride resin and they do not exhibit a stabilizing effect for polyvinyl chloride resin, per se.

It will also be seen that the sulfur-containing organotin compound (comparative sample No. 24) which has an excellent thermal stabilizing effect to a polyvinyl chloride resin is not effective as a thermal stabilizer for the resin composition comprising a polyurethane resin and a polyvinyl chloride resin and that barium stearate (comparative sample No. 15) has a good effect of maintaining the thermal stability for a long time but it is much inferior to the stabilizers of the present invention with respect to the initial thermal stability.

EXAMPLE 3

To 100 parts of a resin composition comprising a polyurethane resin (obtained by reacting an equimolar mixture of polyhexylene adipate (having a molecular weight of 3000), and 1,4-butane diol with an equivalent amount of tolylene diisocyanate; hereinafter referred to as "PU") and a polyvinyl chloride resin (having a degree of polymerization of 1050; hereinafter referred to as "PVC") at the various weight ratios indicated in Table 3, there were added 0.5 part of stearic acid, 0.3 part of Wax-OP and 2.0 parts of barium (3-n-dodecylthio-2-methylpropionate), and the resulting composition was kneaded for 5 minutes by two rolls having a diameter of 8 inches (the roll clearance being 0.5 mm and the rotation rate being 15 rpm), which were maintained at 160° C, to form a sheet having a thickness of 0.5 mm.

The thus-prepared sheets were subjected to the thermal stability test according to the test method described in Example 1. The results obtained are shown in Table 3. The thermal stability was evaluated in the same manner as described in Example 1.

Table 3

| Sample No. | Resin Composition (weight ratio) PVC | PU | Thermal Stability 10 minutes | 20 minutes | 30 minutes | 45 minutes | 60 minutes | 75 minutes | 90 minutes |
| --- | --- | --- | --- | --- | --- | --- | --- | --- | --- |
| 1 (comparison) | 100 | — | 4 | 4 | 6 | 6 | 6 | 6 | 6 |
| 2 (comparison) | 90 | 10 | 4 | 4 | 6 | 6 | 6 | 6 | 6 |
| 3 (comparison) | 80 | 20 | 3 | 3 | 4 | 5 | 6 | 6 | 6 |
| 4 (present invention) | 70 | 30 | 2 | 2 | 3 | 3 | 4 | 5 | 6 |

Table 3-continued

| Sample No. | Resin Composition (weight ratio) PVC | PU | Thermal Stability 10 minutes | 20 minutes | 30 minutes | 45 minutes | 60 minutes | 75 minutes | 90 minutes |
|---|---|---|---|---|---|---|---|---|---|
| 5 (present invention) | 60 | 40 | 1 | 2 | 3 | 3 | 4 | 5 | 6 |
| 6 (present invention) | 50 | 50 | 1 | 2 | 2 | 3 | 3 | 4 | 5 |
| 7 (present invention) | 40 | 60 | 1 | 2 | 2 | 3 | 3 | 4 | 5 |
| 8 (present invention) | 30 | 70 | 1 | 2 | 2 | 3 | 3 | 4 | 5 |
| 9 (present invention) | 20 | 80 | 1 | 2 | 2 | 3 | 3 | 4 | 5 |
| 10 (present invention) | 10 | 90 | 2 | 2 | 2 | 3 | 3 | 4 | 5 |
| 11 (comparison) | — | 100 | 3 | 3 | 4 | 5 | 5 | 6 | 6 |

As will be apparent from the results shown in Table 3, when the weight ratio of the polyurethane resin to the polyvinyl chloride resin is in the range of from 3:7 to 9:1, a very excellent thermal stabilizing effect is achieved.

EXAMPLE 4 a thickness of 0.5 mm in the same manner as described above.

The thus-formed sheets were subjected to the thermal stability test according to the same method as described in Example 1. The results obtained are shown in Table 4. The thermal stability was evaluated in the same manner as described in Example 1.

Table 4

| Sample No. | Resins | Composition (%) | Roll Temperature (° C) | 10 minutes | 20 minutes | 30 minutes | 45 minutes | 60 minutes | 75 minutes | 90 minutes |
|---|---|---|---|---|---|---|---|---|---|---|
| 1 (comparison) | PVC (degree of polymerization of 1050) | 100 | 160 | 4 | 4 | 6 | 6 | 6 | 6 | 6 |
| 2 (present invention) | PVC (degree of polymerization of 1050) PU* | 60 40 | 160 | 1 | 2 | 3 | 3 | 4 | 5 | 6 |
| 3 (present invention) | PVC (degree of polymerization of 1050) PU** | 60 40 | 160 | 3 | 3 | 3 | 4 | 4 | 4 | 5 |
| 4 (present invention) | PVC (degree of polymerization of 1050) PU*** | 60 40 | 160 | 2 | 2 | 3 | 3 | 3 | 4 | 5 |
| 5 (present invention) | PVC (degree of polymerization of 1050) PU**** | 60 40 | 180 | 2 | 3 | 4 | 4 | 5 | 6 | 6 |

Notes
PU* reaction product obtained by reacting an equimolar mixture of polyhexylene adipate having a molecular weight of 3000 and 1,4-butane diol with tolylene diisocyanate
PU** reaction product obtained by reacting a 2 : 1 molar ratio mixture of polytetramethylene glycol having a molecular weight of 1000 and 1,4-butadiene diol and with 4,4-diphenylmethane diisocyanate
PU*** reaction product obtained by reacting an equimolar mixture of polybutylene adipate diol having a molecular weight of 1000 and 1,4-butane diol with 4,4'-diphenylmethane diisocyanate
PU**** reaction product obtained by reacting a 2 : 1 molar ratio mixture of poly-ε-caprolactone having a molecular weight of 2000 and ethylene glycol with tolylene diisocyanate To 100 parts of a polyvinyl chloride resin (having a degree of polymerization of 1050), there were added 0.5 part of zinc stearate and 2.0 parts of barium (3-n-octylthio-2-methylpropionate), and the composition was kneaded for 5 minutes by two rolls having a diameter of 8 inches (the roll clearance being 0.5 mm and the rotation rate being 15 rpm), which were maintained at 160° C, to form a sheet.

Separately, 0.5 part of zinc stearate and 2.0 parts of barium (3-n-octylthio-2-methylpropionate) were added to 100 parts of a polyurethane resin (hereinafter referred to as "PU") indicated in Table 4 and a polyvinyl resin (hereinafter referred to as "PVC") indicated in Table 4, and the composition was kneaded for 5 minutes at a temperature indicated in Table 4 to form a sheet having As will be apparent from the results shown in Table 4, according to the present invention, an excellent thermal stability is imparted to a resin composition comprising a polymeric compound having urethane linkages and a polyvinyl chloride resin, for various kinds of polyurethane resin.

The embodiments of the invention in which an exclusive property or privilege is claimed are defined as follows:

1. A moldable resin composition whose resin ingredients consist essentially of (A) polyurethane resin and (B) polyvinyl chloride resin, blended in a weight ratio A/B of from 9/1 to 3/7, said resin composition containing blended therein (C) from 0.1 to 10 parts by weight, per 100 parts by weight of the sum of A and B, of a thermal stabilizer or mixture of thermal stabilizers having the formula

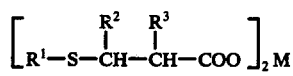

wherein
$R^1$ is cycloalkyl, alkenyl, aralkyl or alkyl having 4 to 18 carbon atoms,
$R^2$ and $R^3$ which can be the same or different, are hydrogen, methyl, ethyl or aryl, and
M is barium, calcium or magnesium.

2. A moldable resin composition according to claim 1 in which the weight ratio of A/B is from 6/4 to 4/6.

3. A moldable resin composition according to claim 1 in which the amount of (C) is from 0.3 to 3.0 parts by weight, per 100 parts by weight of the sum of (A) and (B).

4. A moldable resin composition as claimed in claim 1 in which $R^1$ is cyclohexyl.

5. A moldable resin composition as claimed in claim 1 in which $R^1$ is octadecenyl.

6. A moldable resin composition as claimed in claim 1 in which $R^1$ is benzyl.

7. A moldable resin composition as claimed in claim 1 in which M is barium or calcium.

8. A moldable resin composition as claimed in claim 1 in which M is barium.

9. A moldable resin composition as claimed in claim 1 in which $R^1$ is alkyl having 4 to 18 carbon atoms.

10. A moldable resin composition as claimed in claim 1 in which $R^3$ is methyl and $R^2$ is hydrogen.

11. A moldable resin composition as claimed in claim 1 in which (C) is selected from the group consisting of $[C_{12}H_{25}SCH_2CH_2COO]_2Ba$
$[C_{18}H_{37}SCH_2CH_2COO]_2Ba$

$[C_8H_{17}SCH_2CH(CH_3)COO]_2Ba$
$[C_{12}H_{25}SCH_2CH(CH_3)COO]_2Ba$
$[C_{18}H_{37}SCH_2CH(CH_3)COO]_2Ba$

12. A moldable resin composition as claimed in claim 1 in which (C) is $[C_8H_{17}SCH_2CH(CH_3)COO]_2Ba$.

13. A moldable resin composition as claimed in claim 1 in which (C) is $[C_{12}H_{25}SCH_2CH(CH_3)COO]_2Ba$.

14. A moldable resin composition as claimed in claim 1 in which one of $R^2$ and $R^3$ is methyl, ethyl or phenyl and the other one of $R^2$ and $R^3$ is hydrogen.

15. A moldable resin composition as claimed in claim 1 in which both of $R^2$ and $R^3$ are hydrogen.

16. A process for improving the thermal stability of a resin composition comprising a polyurethane resin and a polyvinyl chloride resin at a weight ratio of from 9:1 to 3:7, which comprises incorporating in said resin composition an effective amount of a sulfur-containing carboxylic acid metal salt having the formula:

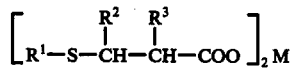

wherein
$R^1$ is cycloalkyl, alkenyl, aralkyl or alkyl having 4 to 18 carbon atoms,
$R^2$ and $R^3$ each are hydrogen, methyl, ethyl or aryl, and
M is barium, calcium or magnesium.

* * * * *